United States Patent
Van Dommele et al.

(10) Patent No.: US 10,982,011 B2
(45) Date of Patent: Apr. 20, 2021

(54) PROCESS FOR ACETYLATION OF WOOD IN THE PRESENCE OF AN ACETYLATION CATALYST

(71) Applicant: TITAN WOOD LIMITED, London (GB)

(72) Inventors: Stefan Van Dommele, London (GB); Bernardus Jozef Maria Pol, London (GB)

(73) Assignee: TITAN WOOD LIMITED, London (GB)

( * ) Notice: Subject to any disclaimer, the term of this patent is extended or adjusted under 35 U.S.C. 154(b) by 0 days.

(21) Appl. No.: 15/312,452

(22) PCT Filed: May 20, 2015

(86) PCT No.: PCT/EP2015/061171
§ 371 (c)(1),
(2) Date: Nov. 18, 2016

(87) PCT Pub. No.: WO2015/177242
PCT Pub. Date: Nov. 26, 2015

(65) Prior Publication Data
US 2017/0096499 A1    Apr. 6, 2017

(30) Foreign Application Priority Data
May 21, 2014    (EP) .................................. 14169338

(51) Int. Cl.
*C08B 3/06*    (2006.01)
*C08H 8/00*    (2010.01)

(52) U.S. Cl.
CPC ................. *C08B 3/06* (2013.01); *C08H 8/00* (2013.01)

(58) Field of Classification Search
CPC ................................... C08H 8/00; C08B 3/06
See application file for complete search history.

(56) References Cited

U.S. PATENT DOCUMENTS

| | | | | | |
|---|---|---|---|---|---|
| 3,720,661 A | * | 3/1973 | Breton | ...................... | C08B 3/06 536/69 |
| 3,994,820 A | * | 11/1976 | Maulding | .............. | C09K 11/07 252/186.41 |
| 4,209,340 A | * | 6/1980 | Yabune | .................. | C08K 5/524 106/170.15 |
| 4,226,981 A | * | 10/1980 | Onda | .................... | A61K 9/2866 424/480 |
| 4,234,718 A | * | 11/1980 | Brown | .................... | C07C 51/56 536/69 |
| 4,234,719 A | * | 11/1980 | Wan | ....................... | C07C 51/56 536/69 |
| 4,592,962 A | * | 6/1986 | Aoki | ..................... | B27K 3/0214 427/325 |
| 2007/0128422 A1 | * | 6/2007 | Nasheri | ................ | B27K 3/0271 428/292.4 |
| 2008/0064763 A1 | * | 3/2008 | Babcock | .............. | A61K 9/1652 514/781 |
| 2008/0139803 A1 | * | 6/2008 | Sasada | ........................ | C08J 5/18 536/58 |
| 2011/0091736 A1 | * | 4/2011 | Felty, Jr. | .................... | C08L 1/12 428/541 |
| 2011/0213140 A1 | * | 9/2011 | Witte | ........................ | C08B 3/06 536/123.1 |
| 2013/0096298 A1 | * | 4/2013 | Combs | ...................... | C08B 3/06 536/76 |
| 2013/0131221 A1 | * | 5/2013 | Basu | ......................... | C08L 1/10 524/32 |
| 2013/0209822 A1 | * | 8/2013 | Maes | .................. | C08G 18/6492 428/541 |
| 2014/0227742 A1 | * | 8/2014 | Bao | ....................... | C07D 307/08 435/72 |
| 2014/0311693 A1 | * | 10/2014 | Painter | ..................... | C08H 8/00 162/76 |
| 2015/0050483 A1 | * | 2/2015 | Pol | ........................... | B27K 3/08 428/220 |
| 2015/0051384 A1 | * | 2/2015 | Alexander | ............. | B27K 5/003 530/504 |

(Continued)

FOREIGN PATENT DOCUMENTS

| DE | 19951734 A1 | 9/2000 | |
|---|---|---|---|
| GB | 2327431 A * | 1/1999 | ........ D06M 13/1845 |
| WO | 2004048417 A1 | 6/2004 | |
| WO | 2007141444 A1 | 12/2007 | |
| WO | 2007144282 A1 | 12/2007 | |
| WO | 2013028489 A1 | 2/2013 | |

OTHER PUBLICATIONS

Peydecastaing et al., Cellulose, 2005, vol. 13, p. 95-103 (Year: 2005).*
Obataya etal. (J. Wood Sci. (2009) 55:18-22) (Year: 2009).*
International Search Report & Written Opinion dated Jul. 20, 2015 from corresponding International PCT Application No. PCT/EP/2015/061171, 12 pages.

*Primary Examiner* — Liam J Heincer
(74) *Attorney, Agent, or Firm* — Innovation Capital Law Group, LLP; Vic Lin

(57) ABSTRACT

The present invention describes a process for the acetylation of wood comprising treating wood with an acetylation agent comprising acetic anhydride and/or acetic acid and subjecting to acetylation conditions, wherein the acetylation reaction is carried out in the presence of an acetylation catalyst comprising a salt of an organic acid, wherein the organic acid is a carboxylic acid, phenol or a substituted phenol, wherein the carboxylic acid is chosen from the list consisting of aromatic carboxylic acids, medium chain saturated monocarboxylic acids, keto acids, dicarboxylic acids, tricarboxylic acids, hydroxy acids, amino acids and derivatives thereof.

16 Claims, 4 Drawing Sheets

(56) References Cited

U.S. PATENT DOCUMENTS

2015/0203595 A1* 7/2015 Petermann .............. C08B 11/20
536/64
2015/0218197 A1* 8/2015 Petermann .............. C08B 11/20
536/66

* cited by examiner

PROCESS FOR ACETYLATION OF WOOD IN THE PRESENCE OF AN ACETYLATION CATALYST

The present invention relates to the acetylation of wood and in particular to a process wherein wood is acetylated in the presence of an acetylation catalyst. The invention further provides acetylated wood and the use of the particular compounds as catalysts for the acetylation of wood.

Acetylation of wood is used for stabilizing the dimensions and/or the biological resistance of wood and lignocellulosic material. Acetylation generally includes an esterification reaction of acetic anhydride and/or acetic acid with free hydroxyl groups of cellulose, hemicelluloses and lignins in the wood.

In the art catalysts are known for the acetylation reaction of wood. Such catalysts include, for example, acetates such as potassium acetate and sodium acetate, or nitrogen-containing heterocyclic compounds such as pyridine and 4-dimethylamino pyridine.

However, acetates have a disadvantage of being corrosive to galvanized steel. Pyridine derivatives are known to be toxic and are thus an unwanted impurity in the acetylated wood. It is further desirable to provide new catalysts for wood acetylation. Preferably, the catalysts should have none of the above-mentioned drawbacks or have these a much lesser degree.

DETAILED DESCRIPTION OF THE INVENTION

Figure 1:
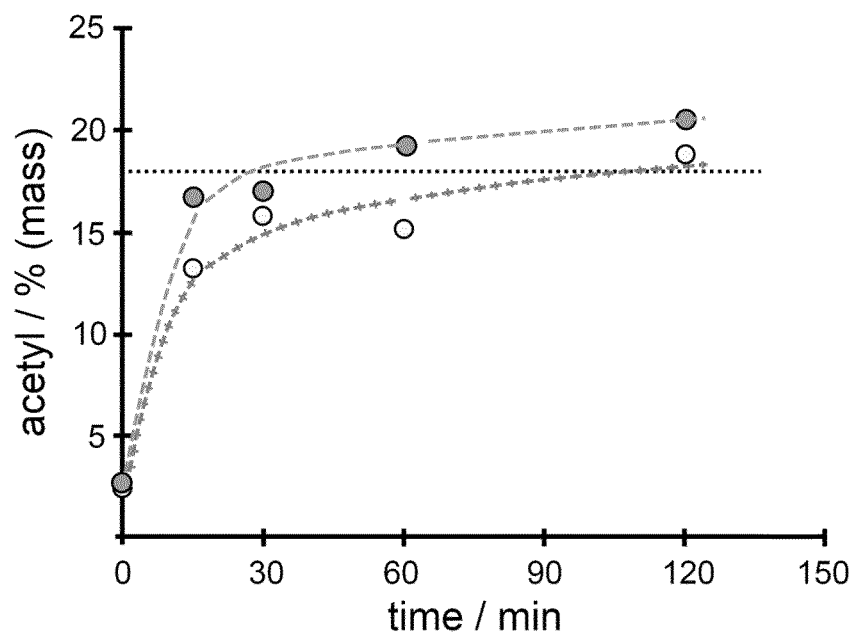
FIG. 1 is a graph illustrating acetyl content versus the reaction time.

In order to address at least some of the above-mentioned desires, the present invention provides, in one aspect, a process for the acetylation of wood comprising treating wood with an acetylation agent comprising acetic anhydride and/or acetic acid and subjecting to acetylation conditions, wherein the acetylation reaction is carried out in the presence of an acetylation catalyst comprising a salt of an organic acid, wherein the organic acid is a carboxylic acid, phenol or a substituted phenol, wherein the carboxylic acid is chosen from the list consisting of aromatic carboxylic acids, medium chain saturated monocarboxylic acids, ketoacids, dicarboxylic acids, tricarboxylic acids, hydroxy acids, amino acids and derivatives thereof.

In another aspect, the invention provides acetylated wood comprising the catalyst as described in the invention.

In a yet further aspect, the invention provides the use of a salt of an organic acid as defined above, as a catalyst for acetylation of wood.

Acetylation of wood is known in the art. Under "wood" it is understood any lignocellulosic material such as solid wood boards but also wood in the form of fibers, chips, particles, flakes, strands, etc. that may be used in the manufacture of engineered wood products, such as fibreboard.

There are no particular limitations on the type of acetylation reaction for which the catalyst as defined in the present invention can be used. Typically, an acetylation reaction comprises treating wood with an acetylation agent and subjecting to acetylation conditions. Acetylation conditions typically include heating to temperatures 80-150° C., preferably in the range 100-140° C. The acetylation agent may be in the liquid or gas phase. Preferably, the acetylation agent comprises acetic acid and/or acetic anhydride, more preferably a mixture of these two. As an example of a suitable acetylation method, reference is made to the method described in EP 0680810 B1. Preferably, the acetylation process is a continuous acetylation process.

According to the present invention, the acetylation reaction is carried out in the presence of an acetylation catalyst comprising a salt of an organic acid not being acetic acid. Without wishing to be bound by theory, the inventors believe that the present catalyst should be of different chemical origin than acetic acid and acetic anhydride, the conventional acetylation agents. Particularly, it was observed that acetates under certain conditions may react with the acetylation agent components. In this way the quality of the acetylation agent may be decreased or even undesirable by-products may be formed leading e.g. to a change in colour. Change in colour may be for example browning of the acetylation agent, which may in turn lead to an undesirable colouration of the wood. In view of this, a proviso is made that the catalyst is not a salt of acetic acid.

The catalyst comprises a salt of an organic acid. The salt can be used as such or obtained in situ from, for example, the corresponding organic acid and another salt or base. Organic acid is defined as an organic compound with acidic properties. In one embodiment, organic acids with a $pK_a$ of less than 9, more preferably less than 8.5, yet more preferably less than 8 are used. Even more preferably, the $pK_a$ of the organic acid is less than 7, such as less than 6, most preferably less than 5.

Preferably, however, the organic acid is a carboxylic acid or a (substituted) phenol. Carboxylic acids are organic acids having at least one carboxyl group. The carboxylic acid preferably has a $pK_a$ under 4.7. Preferably, the carboxylic acid is chosen from the list consisting of aromatic carboxylic acids, medium chain saturated monocarboxylic acids, keto acids, dicarboxylic acids, tricarboxylic acids, hydroxy acids including alpha-hydroxy acids and beta-hydroxy acids, amino acids and derivatives thereof, more preferably from the list consisting of aromatic carboxylic acids, dicarboxylic acids, tricarboxylic acids, (beta-)hydroxy acids, amino acids and derivatives thereof, yet more preferably from the list consisting of aromatic carboxylic acids, dicarboxylic acids, tricarboxylic acids, amino acids and derivatives thereof. In one embodiment, the catalyst comprises a phenolate, such as a nitrophenolate or a dinitrophenolate.

Aromatic carboxylic acids contain conjugated ring of unsaturated bonds. Preferably, the aromatic carboxylic acids used in the present invention contain homocyclic aromatics (as opposed to heterocyclics). In a preferred embodiment, the aromatic carboxylic acid is chosen from the list consisting of benzoic acid, anisic acid, toluolic acid, anthranilic acid, salicylic acid, and derivatives thereof. More preferably, the aromatic carboxylic acid contains a benzyl ring and is a benzoic acid or a substituted benzoic acid.

A preferred group of benzoates can be depicted with the following formula (shown here for Na salt but other metals can also be used):

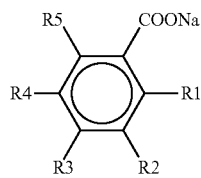

where $R_1$, $R_2$, $R_3$, $R_4$, $R_5$ is independently selected from the list consisting of H, OH, —$NH_2$, Cl, Br, F, I, —$NO_2$, —$OCH_3$. Alternatively, the preferred benzoates can be described as: $R_1R_2R_3R_4R_5C_7OO^-M^+$, wherein $C_7OO^-$ represents an aromatic carboxylic acid residue with substituents $R_1$, $R_2$, $R_3$, $R_4$ and $R_5$ on benzene, and $M^+$ is a metal ion.

Particularly preferred compounds used as a catalyst in the present invention are the following salts, preferably of sodium or potassium-benzoate $C_6H_5COO^-$, 4-chloro benzoate $ClC_6H_4COO^-$, anthranilic acid salt, p-anisic acid salt, toluolic acid salt $(CH_3)C_6H_4(COO^-)$, salicylate.

"Medium chain" denotes in this application aliphatic groups of 6-12 carbon atoms. Preferred medium chain saturated monocarboxylic acid are octanoic acid and decanoic acid. Particularly metal salts thereof, such as $CH_3(CH_2)_6COOMe$, wherein Me is a metal, are preferred. Another preferred salt is sodium decanoate $CH_3(CH_2)_8COONa$.

The carboxylic acid can also be a keto acid and preferably is an acetoacetic acid $CH_3COCH_2COOH$. Particularly, Na or K salts thereof are preferred as the acetylation catalyst.

In another embodiment, the carboxylic acid can be a dicarboxylic, preferably oxalic acid $(COOH)_2$, phthalic acid $C_6H_4(CO_2H)_2$, ascorbic acid, or malonic acid; or a tricarboxylic acid such as citric acid. The carboxylic acid can further comprise hydroxyl groups (hydroxy acid), and is preferably an alpha- or beta hydroxy acid. A preferred example is lactic acid $CH_3C(OH)COOH$.

In yet another embodiment, the carboxylic acid is an amino acid, preferably L-asparagine or glycine. Particularly, sodium salts thereof are preferred as a catalyst but other metal salts are suitable as well.

In a further embodiment, the catalyst comprises a phenolate or derivatives thereof. Particularly sodium salts thereof are preferred, such as sodium nitro-phenolate. In a preferred embodiment, the carboxylic acid salt is a metal salt, and preferably of an alkali or earth alkali metal, more preferably Na or K. In another embodiment the metal is a bivalent metal such as Ca.

The acetylation catalyst as described herein-above can be added at any suitable stage of an acetylation process. The salt of an organic acid can be introduced as such, or can be obtained in situ from, for example, a corresponding organic acid and another salt (or base). A skilled person will easily identify the ways to introduce the catalyst into a particular acetylation process. Preferably, the catalyst is introduced into the wood before the acetylation reaction. For example, the catalyst can be introduced during an impregnation stage preceding the actual acetylation reaction. Preferably, the catalyst is pre-mixed with the acetylation agent and then introduced into the wood to be impregnated. The catalyst is preferably introduced in the wood in an amount lower than 0.50 mmol catalyst per g wood, more preferably, from 0.03 to 0.20 mmol catalyst per g wood.

In a second aspect, the invention provides acetylated wood comprising the catalyst as defined herein-above. The catalyst typically stays in the acetylated wood in the amounts it is added. Therefore, the catalyst is preferably present in the acetylated wood in an amount lower than 0.50 mmol catalyst per g wood, more preferably, from 0.03 to 0.20 mmol catalyst per g wood.

In a yet further aspect, the invention provides the use of a salt of an organic acid, with the proviso that the organic acid is not acetic acid, as a catalyst for the acetylation of wood.

The invention will be illustrated with reference to the following, non-limiting Examples. In the examples and throughout this specification, all percentages, parts and ratios are by weight unless indicated otherwise.

EXAMPLE 1 (RADIATA PINE SOLID WOOD)

To test the catalytic activity of sodium benzoate in the acetylation of Radiata Pine paired samples were prepared from 1 board of this wood species with the dimensions 100×70×25 mm. The paired samples were split into two series, one as reference (blank) and one as a test case for the catalytic acetylation with sodium benzoate. The tests were performed side by side, i.e. one sample from the reference series was treated parallel with the paired sample from the test case series.

All samples were dried in an oven at 103° C. for 48 hours prior to the testing. The reference series were impregnated with a mixture of 10 vol. % acetic acid in acetic anhydride.

The test case series were impregnated with the same mixture to which an amount of sodium benzoate was added to yield a 0.15 molar solution. Impregnation was achieved by submerging the wood blocks in the designated mixture and applying vacuum for 30 minutes. Afterwards, the system was brought back to atmospheric pressure and the samples were allowed to be further impregnated for 30 minutes. The samples were taken out of the liquid and weighed to determine the uptake of the mixture into the samples. Next, the impregnation mixture was heated to 130° C. and the wood sample was submerged in the mixture to acetylate for a specified time. After the reaction, the samples were taken out of the liquid and quenched in cold water to stop the reaction. The unreacted acetic anhydride was thus converted to acetic acid. The wood samples were dried afterwards in an oven at 103° C. for 48 hours.

A specimen of the sample was taken to be used for analysis of the acetyl content. The specimen was grinded to wood flower and washed with a mixture of water and ethanol (50% by volume) to remove the remaining sodium benzoate if present. The washed material was dried in an oven at 103° C. for 24 hours. Afterwards, the samples were analysed using high performance liquid chromatography (HPLC).

The results of the HPLC analyses are displayed in FIG. 1, which shows the acetyl content, expressed as the relative mass of acetyl groups in the acetylated sample, versus the reaction time. As can be seen in this figure, the samples acetylated in the presence of sodium benzoate (grey-filled circles) show a higher yield in acetyl groups compared to the blank (open circles). The influence of sodium benzoate on the acetylation of wood becomes clear when the time to achieve a certain acetyl yield is considered. For example, in FIG. 1 an acetyl level of 18% is marked by a horizontal, dotted line. To achieve this level it would take about 110 minutes in an non-catalysed acetylation whereas in a sodium benzoate catalysed acetylation this would take approximately 30 minutes, thus a time reduction by more than 70%.

EXAMPLE 2 (SITKA SPRUCE CHIPS)

Wood chips of Sitka Spruce (of average size 6-29 mm in length, 5-19 mm in width and 1-5 mm in thickness, capable of passing through a 10 mm but not a 4 mm sieve) were dried in an oven at 103° C. for 24 hours and then added to a heated mixture of 10 vol. % acetic acid in acetic anhydride to which an amount of catalyst was added to yield a 0.06-0.07 molar solution. The catalyst was taken from the list of salts of aromatic carboxylic acids consisting of sodium benzoate, the sodium salt of anthranilic acid, the sodium salt of p-anisisic acid, the sodium salt of 4-chloro-benzoic acid and the sodium salt of 2-hydroxy-benzoic acid.

The mixture was heated to a temperature between 100 and 137° C. As reference, wood chips of the same species were reacted in the same acetic acid in acetic anhydride mixture but without the presence of a catalyst. The acetylation reaction was executed for 30 minutes after which the chips were taken out of the liquid and quenched in cold water to stop the reaction and convert the unreacted acetic anhydride to acetic acid. The samples were then dried in an oven at 103° C. for 24 h. Next, the samples were grinded and washed with a mixture of water and ethanol (50% by volume) to remove the salt if present. Next, the samples were dried in an oven at 103° for 24 hours and analysed for acetyl groups using Near Infra-Red Spectroscopy (NIR).

The results of the NIR analyses are presented in the below table, where acetyl content (wt. %) expressed as the relative mass of acetyl groups in the acetylated sample, is given for the three reaction temperatures used.

| Catalyst | Acetyl (wt. %) | | |
|---|---|---|---|
| | T = 100° C. | T = 120° C. | T = 137° C. |
| Sodium benzoate | 12.8 | 17.2 | 20.0 |
| Sodium p-anisate | 13.1 | 17.5 | 20.2 |
| Sodium anthranilate | 12.3 | 16.0 | 19.1 |
| Sodium salicylate | 13.2 | 17.1 | 19.9 |
| Sodium 4-chlorobenzoate | 13.6 | 16.8 | 20.2 |
| -(no catalyst) | 10.8 | 14.4 | 16.2 |

Figure 2:
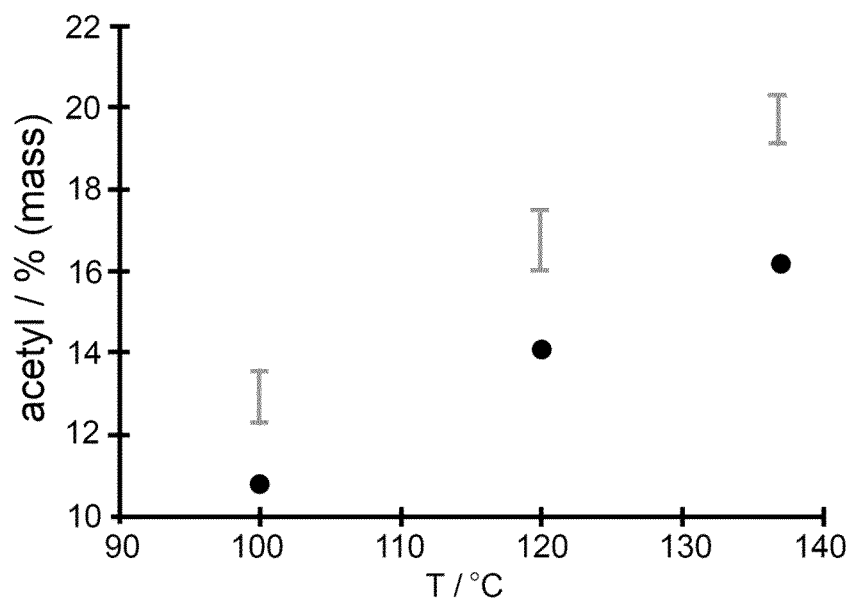
FIG. 2 is a graph illustrating acetyl content versus the reaction temperature.
Figure 3:
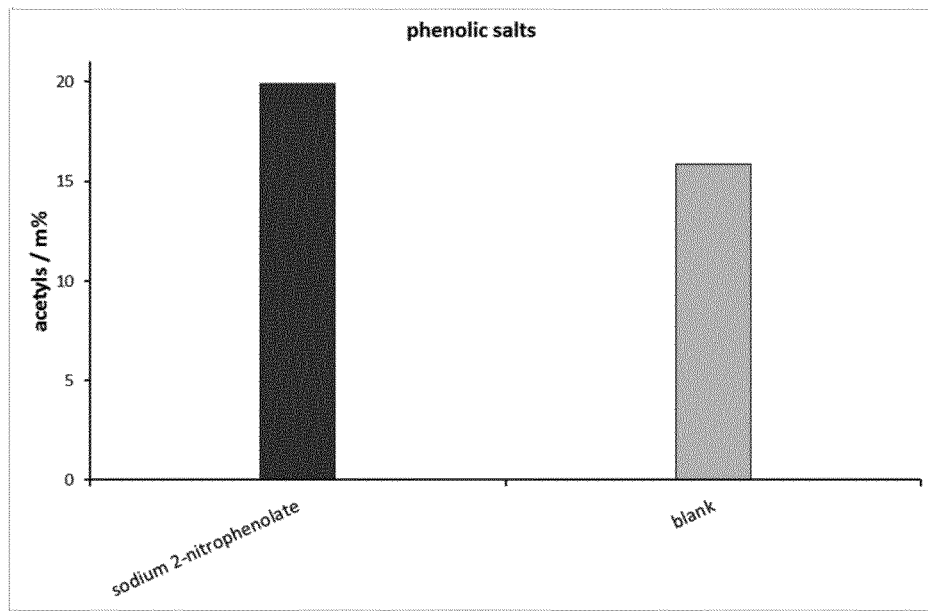
FIG. 3 is a graph illustrating the effect of phenolic salts on acetylation.
Figure 4:
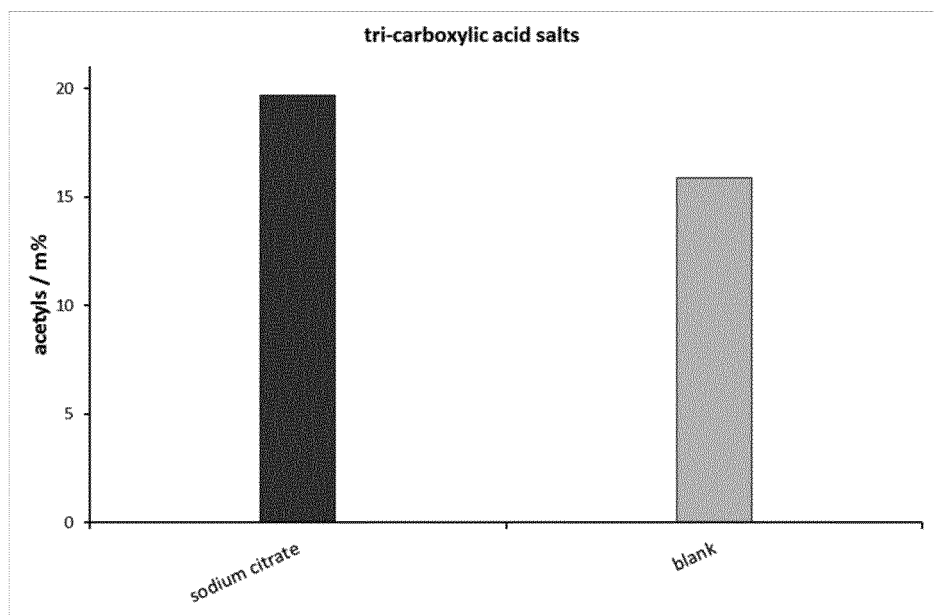
FIG. 4 is a graph illustrating the effect of tri-carboxylic acid salts on acetylation.
Figure 5:
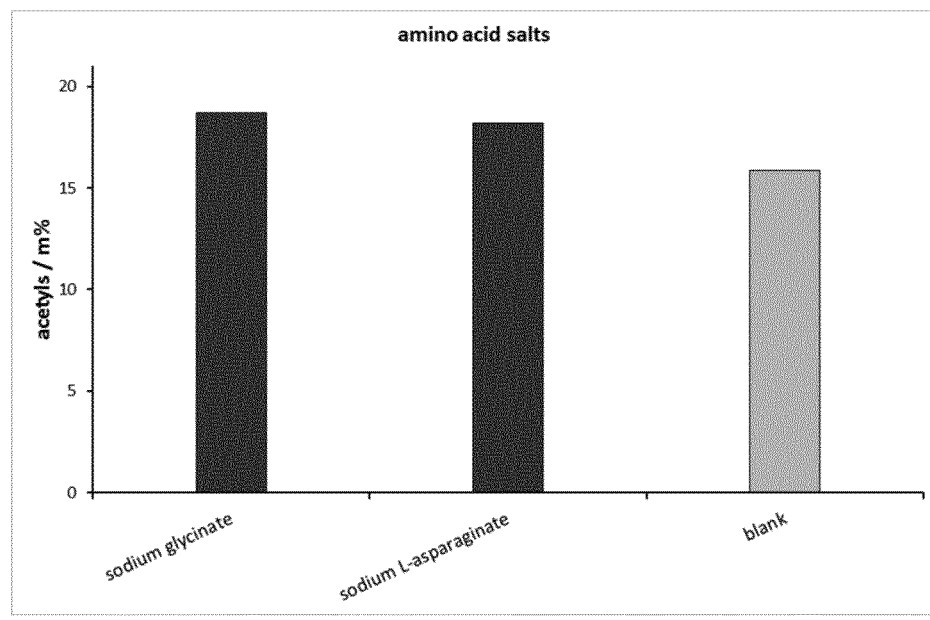
FIG. 5 is a graph illustrating the effect of amino acid sales on acetylation.
Figure 6:
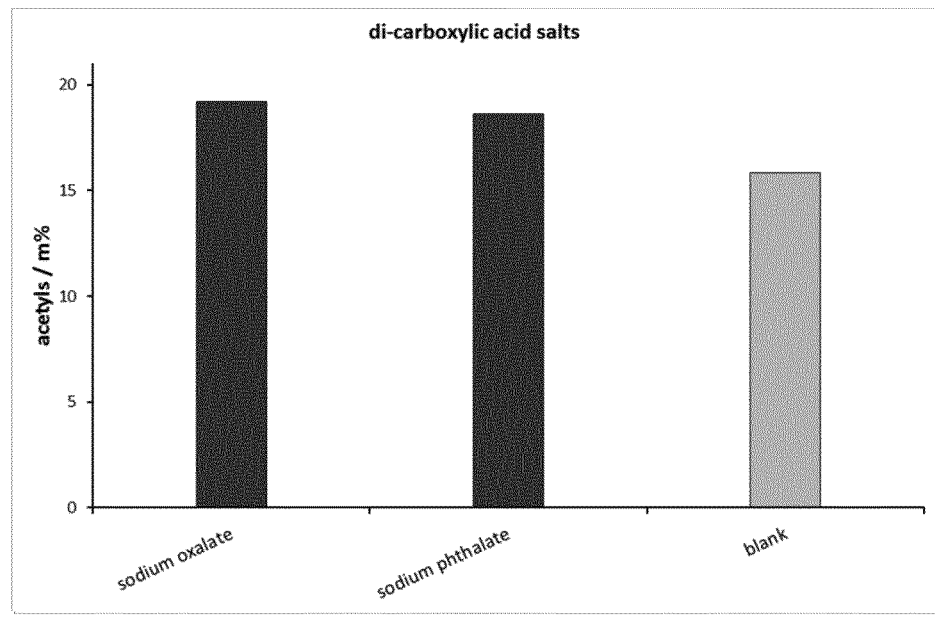
FIG. 6 is a graph illustrating the effect of di-carboxylic acid salts on acetylation.

The results are also displayed in FIG. 2. Grey ranges indicate the ranges of acetyl content which accommodate the results achieved with different of the mentioned catalysts. Black dots correspond to the acetyl content obtained without the catalysts.

As can be seen in this figure, the samples acetylated in the presence of a catalyst always yielded a significantly higher amount of acetyl groups compared to the blank.

EXAMPLE 3

Example 2 was repeated at 137° C. with the catalysts representing different groups of salts of organic acids. The catalysts were selected from the list consisting of sodium 2-nitrophenolate, sodium caprylate (octanoate), sodium oxalate, sodium phtalate, sodium citrate, sodium L-asparaginate and sodium glycinate. The catalysts were tested together with a blank sample without a catalyst. The result of the blank is an average of 3 runs.

The results are presented in the table below and also in FIGS. 3-6.

| Organic acid group | Catalyst | Acetyl (wt. %); T = 137° C. |
|---|---|---|
| Phenol | Sodium 2-nitrophenolate | 19.9 |
| Medium chain saturated monocarboxylic acids | Sodium caprylate | 16.3 |
| Dicarboxylic acids | Sodium oxalate | 19.2 |
| | Sodium phtalate | 18.6 |
| Tricarboxylic acids | Sodium citrate | 19.7 |
| Amino acids | Sodium L-asparaginate | 18.2 |
| | Sodium glycinate | 18.7 |
| | -(without catalyst) | 15.9 |

The samples acetylated in the presence of the catalyst yielded a higher amount of acetyl groups compared to the blank.

It should be said that it is notoriously difficult to obtain an acetyl content higher than 17 wt. % in the wood, in view of a natural limitation of about 22-25 wt. % for the saturation of hydroxyl groups in the wood with acetyl. Above about 15 wt. % it takes more and more time to reach extra 1 wt. % of the acetyl content, due to the flattening out of the acetyl content curve (see FIG. 2). Therefore, each additional 1% of acetyl content above 15% that can be reached in a relatively short time is an important advantage, especially for acetylation processes limited in time (e.g. continuous acetylation process with a predetermined screw velocity).

The invention claimed is:

1. Process for the acetylation of wood comprising treating wood with an acetylation agent comprising acetic anhydride and acetic acid and subjecting to acetylation conditions, wherein the acetylation reaction is carried out in the presence of an acetylation catalyst comprising a salt of an organic acid, wherein the organic acid is one or more selected from the group consisting of acetoacetic acid, oxalic acid, phthalic acid, citric acid, L-asparagine and glycine, wherein the process comprises:
   providing a mixture comprising the acetylation catalyst, acetic anhydride, and acetic acid, and
   introducing the mixture into the wood.

2. The process according to claim 1, wherein the salt is a metal salt.

3. The process according to claim 1, wherein the medium chain saturated monocarboxylic acid is octanoic acid or decanoic acid.

4. The process according to claim 1, wherein the acetylation catalyst comprises a salt of acetoacetic acid.

5. The process according to claim 1, wherein the acetylation catalyst further comprises a salt of an aromatic carboxylic acid, wherein the aromatic carboxylic acid is one or more selected from the group consisting of benzoic acid, 4-chloro-benzoic acid, p-anisic acid, toluolic acid, anthranilic acid, salicylic acid, and derivatives thereof.

6. The process according to claim 1, wherein the acetylation catalyst comprises a salt of oxalic acid or a salt of phthalic acid.

7. The process according to claim 1, wherein the acetylation catalyst comprises a salt of citric acid.

8. The process according to claim 1, wherein the acetylation catalyst comprises a salt of L-asparagine or a salt of glycine.

9. The process according to claim 1, wherein the acetylation conditions include a temperature of 80-150° C.

10. The process according to claim 1, being a continuous acetylation process.

11. Acetylated wood comprising the catalyst as defined in claim 1.

12. The process according to claim 1, wherein the salt is an alkali or earth alkali metal salt.

13. The process according to claim 1, wherein the salt is a Na or K salt.

14. The process according to claim 1, wherein the mixture is introduced in the wood in an amount in a range of above 0.03 mmol of said acetylation catalyst per gram of wood and lower than 0.50 mmol of said acetylation catalyst per gram of wood.

15. A method of catalyzing the acetylation of wood, wherein the method comprises using a salt of an organic acid as a catalyst in an acetylation reaction of wood, wherein said organic acid is one or more selected from the group consisting of acetoacetic acid, oxalic acid, phthalic acid, citric acid, L-asparagine and glycine.

16. A process for the acetylation of wood comprising treating wood with an acetylation agent comprising acetic anhydride and acetic acid and subjecting to acetylation conditions, wherein the acetylation reaction is carried out in the presence of an acetylation catalyst comprising a salt of benzoic acid, wherein the mixture is introduced in the wood in an amount in a range of above 0.03 mmol of said acetylation catalyst per gram of wood and lower than 0.50 mmol of said acetylation catalyst per gram of wood, wherein the process comprises:
  providing a mixture comprising the acetylation catalyst, acetic anhydride, and acetic acid, and
  introducing the mixture into the wood.

\* \* \* \* \*